United States Patent [19]
Fisher

[11] 3,805,673
[45] Apr. 23, 1974

[54] FLUID SYSTEMS
[76] Inventor: David Fisher, 22, Beechurst Rd., Liverpool, England
[22] Filed: Feb. 27, 1973
[21] Appl. No.: 336,249

Related U.S. Application Data
[62] Division of Ser. No. 171,137, Aug. 12, 1971, abandoned.

[52] U.S. Cl.............. 91/411 R, 60/581, 137/455, 137/460, 137/466, 303/84 A
[51] Int. Cl............................................. F15b 11/16
[58] Field of Search ........... 137/455, 456, 460, 465, 137/466; 303/84 A; 60/581

[56] References Cited
UNITED STATES PATENTS

| | | | |
|---|---|---|---|
| 1,831,081 | 11/1931 | Smith............................. | 303/84 A |
| 1,905,077 | 4/1933 | Walker............................ | 303/84 A |
| 2,482,328 | 9/1949 | Derry et al...................... | 303/84 A |
| 2,556,613 | 6/1951 | Carter............................. | 137/460 X |
| 2,591,641 | 4/1952 | Troendle......................... | 137/456 X |
| 3,408,813 | 11/1968 | Dufault........................... | 60/54.5 |

FOREIGN PATENTS OR APPLICATIONS
601,743  2/1960  Italy................................... 137/460

*Primary Examiner*—Edgar W. Geoghegan
*Attorney, Agent, or Firm*—Scrivener Parker Scrivener and Clarke

[57] ABSTRACT

A valve assembly for use in fluid systems has a valve closure member displaceable relative to a valve seat on the establishment of a fluid pressure difference across the closure member, the closure member engaging the seat to stop fluid flow only when the pressure difference exceeds a predetermined maximum. A by-pass may be opened around the closure member to allow unimpeded fluid flow when it is necessary to flush the system. There is also disclosed a valve assembly having several closure members and valve seats, each having a separate outlet and having a common inlet and common by-pass.

5 Claims, 10 Drawing Figures

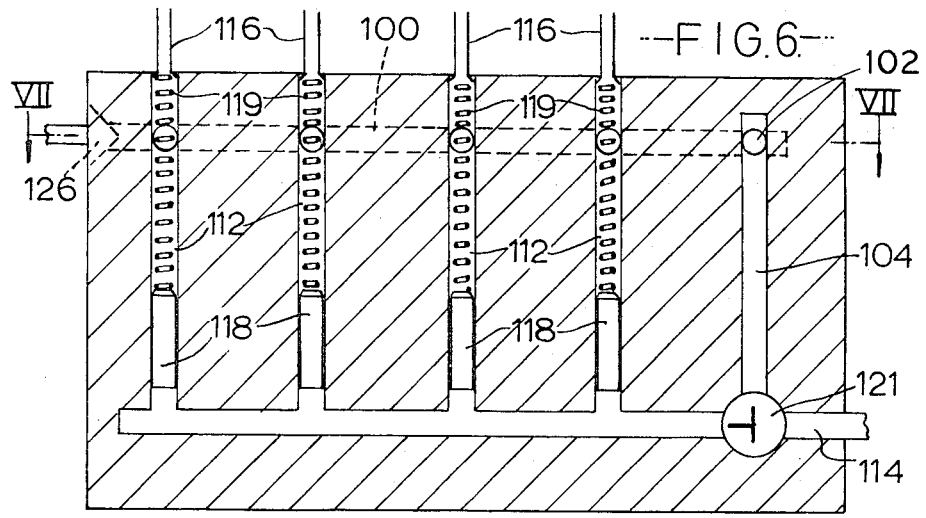
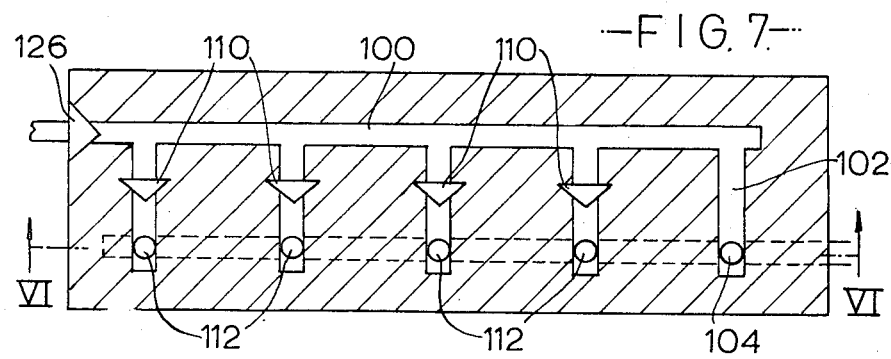
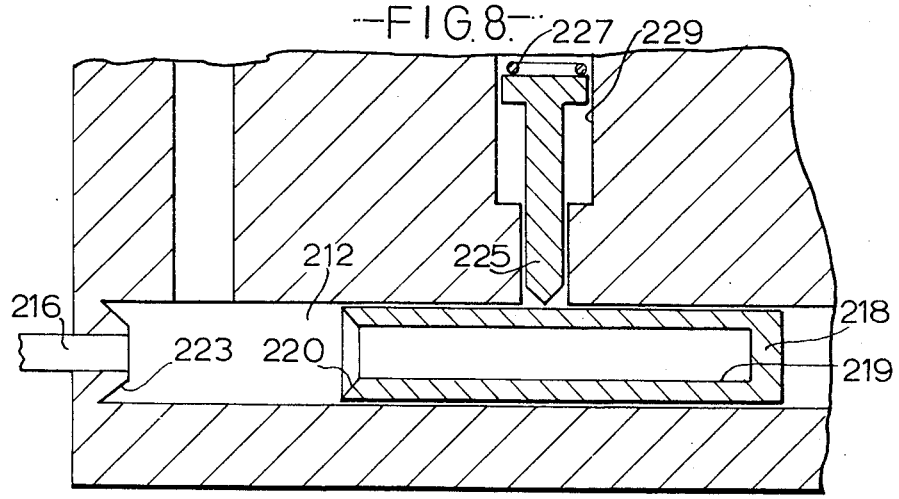

3,805,673

FLUID SYSTEMS

This is a division of application Ser. No. 171,137 filed Aug. 12, 1971, now abandoned.

The present invention concerns fluid systems and relates more particularly to fluid valve assemblies.

According to the present invention, a valve assembly comprises a chamber having a fluid inlet and a fluid outlet for connection to a source of fluid pressure and to a load respectively, valve closure means displaceable in the chamber on the establishment of a pressure difference between the pressure source and the load and adapted to cooperate with a valve seat formed around the outlet to seal the outlet when said pressure difference exceeds a predetermined maximum, a fluid by-pass extending between the inlet and the outlet and valve means for selectively directing fluid either into the chamber or through the by-pass.

Whilst it may only be necessary in some applications to provide a single chamber and single valve closure, the invention also provides a valve assembly having a plurality of chambers each containing valve closure means and each having a separate outlet, a common inlet and a common by-pass leading from the by-pass valve means to each chamber. In a preferred embodiment, the common by-pass communicates with each chamber adjacent to the respective outlets and is extended beyond the chambers to a second fluid inlet, a non-return valve being arranged at the second inlet to prevent fluid flow from the by-pass out of the second inlet and a non-return valve being arranged between each chamber and the by-pass to prevent fluid flow out of the chambers into the by-pass.

The invention is further described, by way of example, with reference to the diagrammatic drawings, in which.

Figure 1:
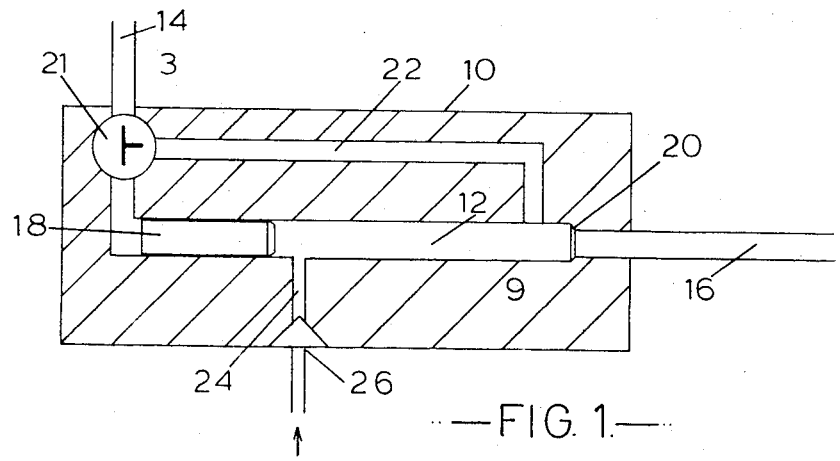
FIG. 1 is a section through a valve assembly having a single piston.
Figure 3:
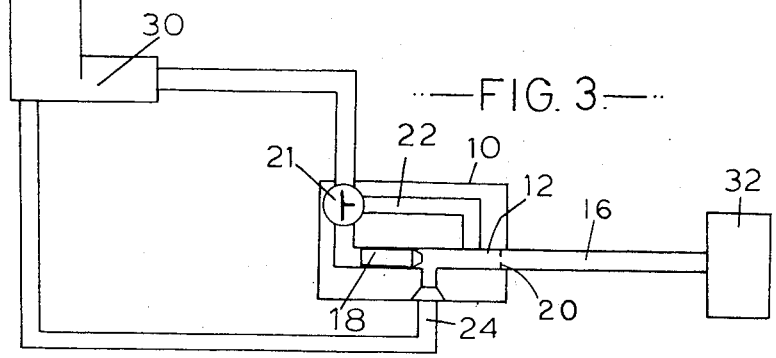
Figure 4:
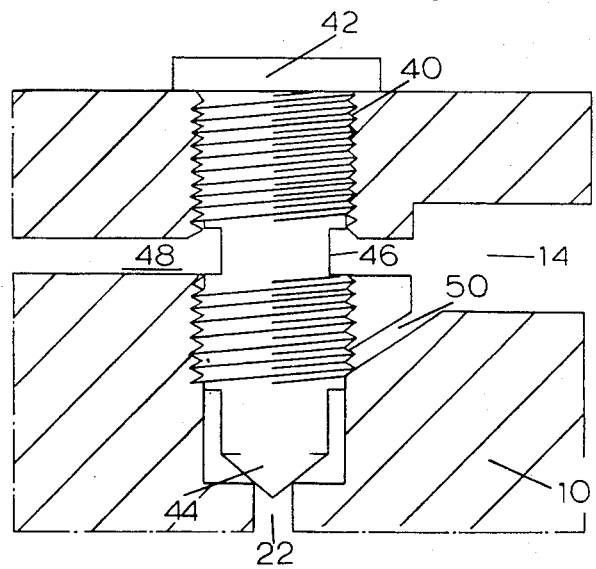
Figure 5:
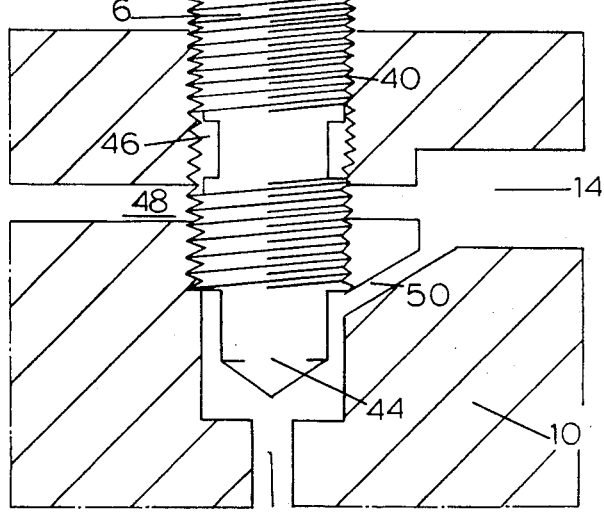
Figure 9:
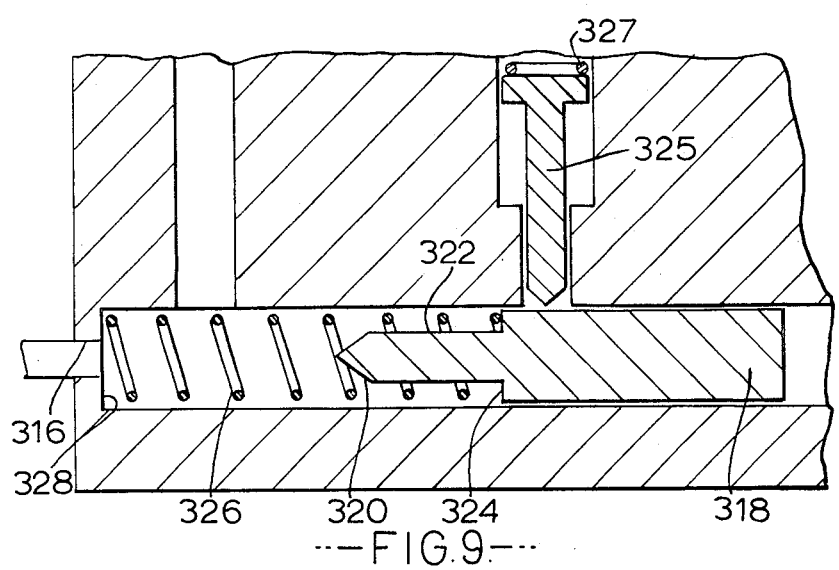
Figure 10:
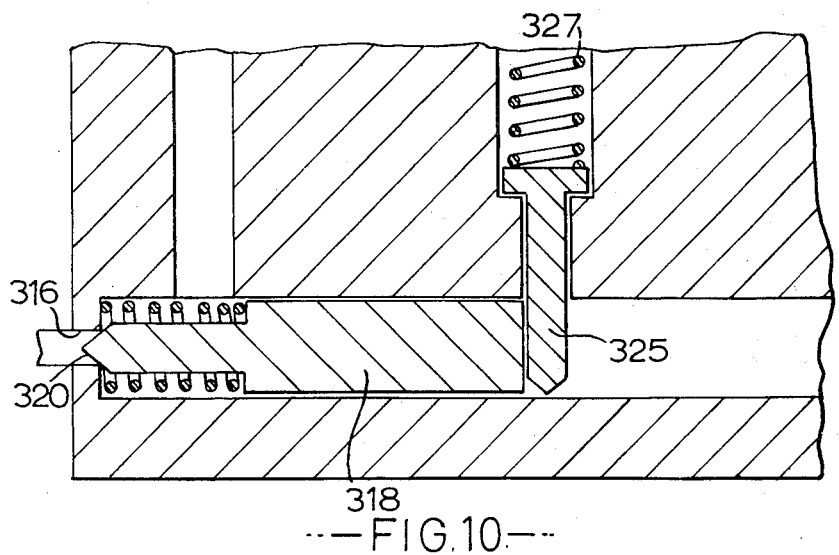

FIG. 3 shows the valve assembly of FIG. 1 connected into a hydraulic fluid system, FIGS. 4 and 5 show a three way valve for use in the valve assemblies of the invention, in two operative positions, FIG. 6 is a section through a second embodiment of multi-piston valve assembly on the line VI—VI of FIG. 7, FIG. 7 is a section on the line VII—VII of FIG. 6, FIG. 8 is a sectional detail showing an alternative piston configuration, and FIGS. 9 and 10 are sectional details showing another alternative piston configuration with the piston in two different positions.

The valve assembly shown in FIG. 1 comprises a housing 10 containing a chamber 12 which has an inlet passage 14 and an outlet passage 16 provided with a valve seat 20. A valve member comprising a piston 18 is slideable in the chamber 12 and is normally positioned adjacent to the inlet passage 14 as is shown in FIG. 1. A three-way valve 21 permits communication to be opened either between the inlet passage 14 and the chamber 12 or between the inlet passage 14 and a by-pass 22 which leads into the chamber 12 beyond the downstream end of the piston 18 when the piston 18 is in its normal rest position.

A further passage 24 incorporating a non-return valve 26 also leads into the chamber 12 downstream of the piston 18 when the piston 18 is in its normal rest position.

Figure 2:
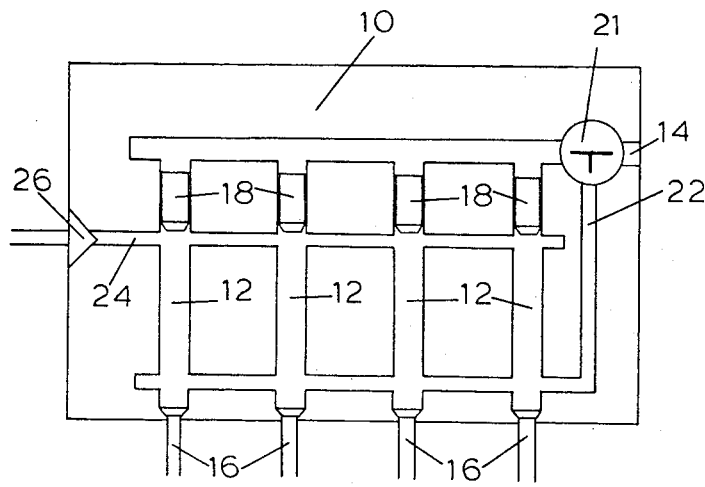
FIG. 2 is a section through a multi-piston valve assembly.

A valve assembly having four pistons 18 is shown schematically in FIG. 2 in which similar reference numerals have been used for similar features. Each of the four pistons 18 is slideable in a chamber 12 formed in a housing 10. A three-way valve 21 serves to provide communication either between an inlet passage 14 and each of the chambers 12 or between the inlet passage 14 and a common by-pass 22. Each chamber 12 has an individual outlet passage 16 and communicates with a common passage 24 which incorporates a non-return valve 26.

A typical application of the valve assemblies described is illustrated schematically in FIG. 3 which shows, for simplicity, the embodiment of FIG. 1 connected into a vehicle hydraulic braking system. A brake master cylinder 30 having an integral reservoir 34 is coupled to the three-way valve 21 and the outlet of the valve assembly is coupled to a brake wheel cylinder 32. The passage 24 communicates with the fluid reservoir 34. If the embodiment of FIG. 2 is connected into a vehicle braking system, the four outlets 16 will be coupled to respective wheel cylinders on four wheels of the vehicle. It may however be advisable to employ a valve assembly having only three valve members and outlets, one outlet being coupled to the wheel cylinders of both front wheels of the vehicle.

When the vehicle braking system is actuated, fluid is forced from the master cylinder 30 through the three-way valve 21, and, when the three-way valve provides direct communication with the chamber 12, into the chamber 12 upstream of the piston 18. The piston 18 is thereby displaced towards the outlet passage 16 as fluid downstream of the piston 18 is forced into the wheel cylinder 32. The dimensions of the chamber 12 and piston 18 are adapted to the capacity of the wheel cylinder 32 so that, under maximum braking effort, the piston 18 stops short of its valve seat 20. In the event of fluid leakage downstream of the piston 18 resulting, for example, from a fractured conduit, the piston 18 is forced against its valve seat 20 and prevents further flow of fluid from the master cylinder 30 to the point of leakage. Thus, on brake actuation, only the wheel cylinder adjacent to the leak will be inoperative and excessive loss of hydraulic fluid will be avoided.

The function of the by-pass 22 is to permit bleeding of the system, that is, to permit fluid to be forced through the system and out of the wheel cylinder 32 to remove air or other contaminants which may have entered the system. The three-way valve 21 is moved into the position in which communication is opened between the inlet 14 and the by-pass 22 and fluid is forced through the system in a conventional manner, without displacing the piston or pistons 18.

Communication between the passage 24 and the fluid reservoir 34 provides for replenishment of the system downstream of the normal rest position of the piston or pistons 18 to compensate for such effects as contraction of fluid volume caused by low ambient temperatures or minor leakage.

A three way valve which may advantageously be used in the valve assemblies described is shown in FIGS. 4 and 5. A threaded bore 40 is formed in the housing 10 and is threadedly engaged by a screw 42 which has a conical tip 44 and a waisted portion 46 of reduced diameter. In a first position of the three-way valve shown in FIG. 4, the screw 42 is screwed into its bore 40 so that the conical tip 44 seals the by-pass 22, the waisted portion 46 providing communication between the inlet 14 and a continuation 48. In the position of FIG. 5, the conical tip 44 has been lifted from the by-pass 22 which then communicates with the inlet 14 by way of a passage 50. The waisted portion 46 has been lifted out of registry with the extension 48 of the inlet 14 so that communication between the inlet 14 and extension 48 is closed.

The three-way valve described is of simple construction and is easy to operate, and may be used in applications other than the valve assemblies and fluid systems described.

FIGS. 6 and 7 show a modification of the valve assembly of FIG. 2. In essence, the embodiment of FIGS. 6 and 7 differs from that of FIG. 2 in that a passage extending between the three-way valve 121 and non-return valve 126 combines the functions of the by-pass 22 and passage 24 of FIG. 2. This passage is formed in three parts 100, 102 and 104, the part 100 communicating with the outlets 116 by way of respective non return valves 110 which prevent flow of fluid between chambers 112 downstream of the pistons 118 and thereby ensure that the pistons 118 are maintained in aligned positions within their respective chambers 112.

The pistons 118 are biased towards their normal rest positions, preferably against stop means (not shown) by coil springs 119. As in the embodiment of FIG. 2, an inlet passage 114 is provided to feed fluid to the chambers 112 by way of the three-way valve 121.

The piston 218 shown in FIG. 8 is formed as a cylinder with an axial bore 219 and an inner frusto-conical sealing surface 220 for engagement with a frusto-conical seat 223 formed around a fluid outlet 216. The piston 218 is preferably spring-biased (not shown) into the normal rest position shown in FIG. 8. A pin 225 is urged towards the piston 218 by a compression spring 227 arranged in a bore 229 perpendicular to the chamber 212 in which the piston 218 is slideable. The spring-loaded pin 225 serves to lock the sealing surface 220 of the piston 218 in contact with the valve seat 223 in a manner which will be clear from FIGS. 9 and 10 which show another modified piston and valve seat configuration.

In FIGS. 9 and 10, the piston 318 has a conical sealing surface 320 and a reduced diameter portion 322 defining a shoulder 324. A coil spring 326 is positioned around the reduced diameter portion 322 and abuts the shoulder 324 and a similar shoulder 328 formed around the outlet 316. The spring 326 biases the piston 318 towards its normal rest position shown in FIG. 9. As in the embodiment of FIG. 8, a coil spring 327 biases a pin 325 towards the piston 318.

FIG. 10 shows the piston 318 displaced to such an extent that its sealing surface 320 closes the outlet 316. The piston 318 has a length such that, when the sealing surface 320 closes the outlet 316, the pin 325 is urged by its spring 327 behind the piston 318 to lock the piston in place.

It is preferred that the pin 225 or 325 only be retractable upon dismantling of the valve assembly so that it is not possible to open the outlet to fluid flow without dismantling the fluid system into which the valve assembly will be incorporated. The fault which gave rise to the excessive piston displacement causing closure of the outlet may then be ascertained and rectified whilst the system is dismantled.

Although the operation of valve assemblies has been described with reference to a hydraulic fluid system such as a motor vehicle braking system, it will be clear that valve assemblies constructed in accordance with the invention may be used in other fluid systems, either hydraulic or pneumatic, in which it is desirable to automatically isolate one or more fluid lines should a severe pressure drop occur in such lines.

I claim:

1. A valve assembly comprising a housing, a plurality of chambers in said housing, a separate outlet from each chamber for connection to respective loads, a common inlet to said chambers for connection to a source of fluid pressure, valve closure means in each chamber displaceable on the establishment of a pressure difference between said source and the respective load connected to each chamber, a by-pass from said common inlet to said outlet, valve means for selectively directing fluid either into said common inlet or through said by-pass, a second outlet for connection to a fluid reservoir, said by-pass communicating with each of said chambers adjacent their outlets and extending to said second outlet, a check valve arranged adjacent said second outlet to prevent fluid flow from said by-pass out of said second outlet while permitting fluid flow from a reservoir into said by-pass, and a check valve arranged between each of said chambers and said by-pass to prevent fluid flow out of said chambers into said by-pass while permitting fluid flow from said by-pass into the respective chambers for recuperation of losses from said chambers downstream from the valve closure means due to minor leaks.

2. A valve assembly according to claim 1 including means to lock each valve closure means in sealing position when displaced thereto.

3. A valve assembly according to claim 1 wherein said locking means comprises a spring loaded pin associated with each of said valve closure means and movable transversely of said valve closure means to lock said valve closure means against return displacement from its sealing position.

4. A valve assembly according to claim 1 wherein each valve closure means is resiliently biassed away from its sealing position.

5. A valve assembly according to claim 1 wherein said valve means is a manually-operable three-way valve.

* * * * *